United States Patent [19]

Smith et al.

[11] Patent Number: 5,062,238

[45] Date of Patent: Nov. 5, 1991

[54] ROSE THORN STRIPPER

[76] Inventors: Glenn Smith; Roseanna Smith, both of R.R. #2, Box 33-3, Covington, Ind. 49732

[21] Appl. No.: 552,071

[22] Filed: Jul. 13, 1990

[51] Int. Cl.⁵ .............................................. A01G 1/04
[52] U.S. Cl. ..................................... 47/1.01; 30/279.2
[58] Field of Search .................. 47/1.01; 30/286, 287, 30/278, 279.2, 253

[56] References Cited

U.S. PATENT DOCUMENTS

| | | | |
|---|---|---|---|
| 2,167,337 | 7/1939 | De Meester | 47/1.01 |
| 4,455,784 | 6/1984 | Gallo | 47/1 |
| 4,677,702 | 7/1987 | Cairns | 7/107 |
| 4,799,406 | 1/1989 | Diaz-De-Guerenu-Aguirrebeitia | 81/9.4 |
| 4,805,307 | 2/1989 | Lucas, Jr. et al. | 30/294 |
| 4,835,862 | 6/1989 | Phillips | 30/90.1 |
| 4,837,931 | 6/1989 | Beermann | 30/92 |

*Primary Examiner*—Douglas D. Watts
*Attorney, Agent, or Firm*—Locke Reynolds

[57] ABSTRACT

An apparatus for removing protuberances such as thorns extending from a plant stem includes a first and second stripping arm pivotally attached to each other. The arms have a plurality of concave sections set along the opposing edges of each arm to allow a plant stem to be inserted therebetween. The apparatus is mounted to a table by a plate attached to one of the arms.

12 Claims, 1 Drawing Sheet

ROSE THORN STRIPPER

FIELD OF THE INVENTION

This invention relates to a stripper for removing thorns, excess foliage, and other protuberances from the stem of a Plant. More particularly, a manually operated apparatus that enables the removal of thorns from roses is described.

BACKGROUND AND SUMMARY OF THE INVENTION

Removal of thorns, excess foliage, or other protuberances from ornamental flowers or other plants is commonly practiced by florists prior to sale of the flower or plant. Because of the relatively large number of thorns contained on each plant stem, the rose in particular is often dethorned by a florist before sale. Although this practice reduces the chance of injury to a buyer of the rose, the florist can still be punctured or scraped by rose thorns during the dethorning process.

Manually held devices that aid the florist in dethorning roses are widely available. For instance, U.S. Pat. No. 4,455,784 to Gallo describes a stem cleaner for cutting away thorns from a stem. The described device has a flexible handle with two free ends to which cutting blades are attached. The stem cleaner is positioned around a flower stem and moved up and down along the length of the stem to remove thorns without stripping the surface bark of the stem. However, the possibility of misplacing this device, coupled with the chance of inadvertent puncture as the grasp of florist on the stem is altered, can be disadvantageous when large numbers of roses are to be dethorned.

Therefore, it is an object of this invention to provide a thorn stripper that aids in the removal of thorns from roses or other plants.

Another object of this invention is to provide a manually operated thorn stripper having a plurality of diversely sized cutting channels through which plant stems of various diameters can be drawn.

In accordance with the foregoing objectives a tool for removing protuberances such as thorns or foliage extending from a plant stem is provided. The tool has a first stripping arm having a first stripping edge, a second stripping arm having a second stripping edge and positioning means for positioning at least a portion of the second stripping edge of the second stripping arm at a predetermined distance greater than a diameter of the stem from the first stripping edge of the first stripping arm. The first and second stripping arms are attached to mounting means that includes a plate affixed in a desired orientation to a top or side of a base such as a floral preparation table.

In preferred embodiments the apparatus according to the present invention is utilized to dethorn roses. The apparatus has a first stripping arm configured to have a straight edge with plurality of inset channels set along the edge in spaced apart relationship. The second stripping arm is pivotally connected to the first stripping arm and provided with a plurality of channels whose size and positioning mirror those channels set into the first stripping arm. In operation, a portion of a rose stem is placed in a first channel in the first stripping arm that has a diameter slightly greater than a diameter of the rose stem to be dethorned. The second arm is pivoted about its connecting pivot to bring a second channel corresponding in size to the first channel into a position opposite the first channel. The rose stem is then longitudinally drawn through a space defined by the first and second channels, causing any protuberances from the rose stem to be torn from the stem as they contact the first or second arm. Since the first and second stripping arms are attached to a plate affixed to a table or other base, the first and second stripping arms do not rotate or otherwise move with respect to the base (other than the pivot action of the second arm) during this dethorning process.

One advantage of the present invention is the ease of stripping thorns or other protuberances from plants such as roses with minimal effort and the possibility of high repetition rates desired by commercial vendors of such plants.

Another advantage of the present invention is the reduction in chance of injury to a florist or commercial seller in the dethorning process attributable to inadvertent rotation or movement of the dethorning tool.

Still another advantage of the present invention is the reduction in the chance of damaging, cutting or gouging a plant stem during the dethorning process because of the alignment support provided by the permanently mounted dethorning tool

DETAILED DESCRIPTION OF THE DRAWINGS

Figure 1:
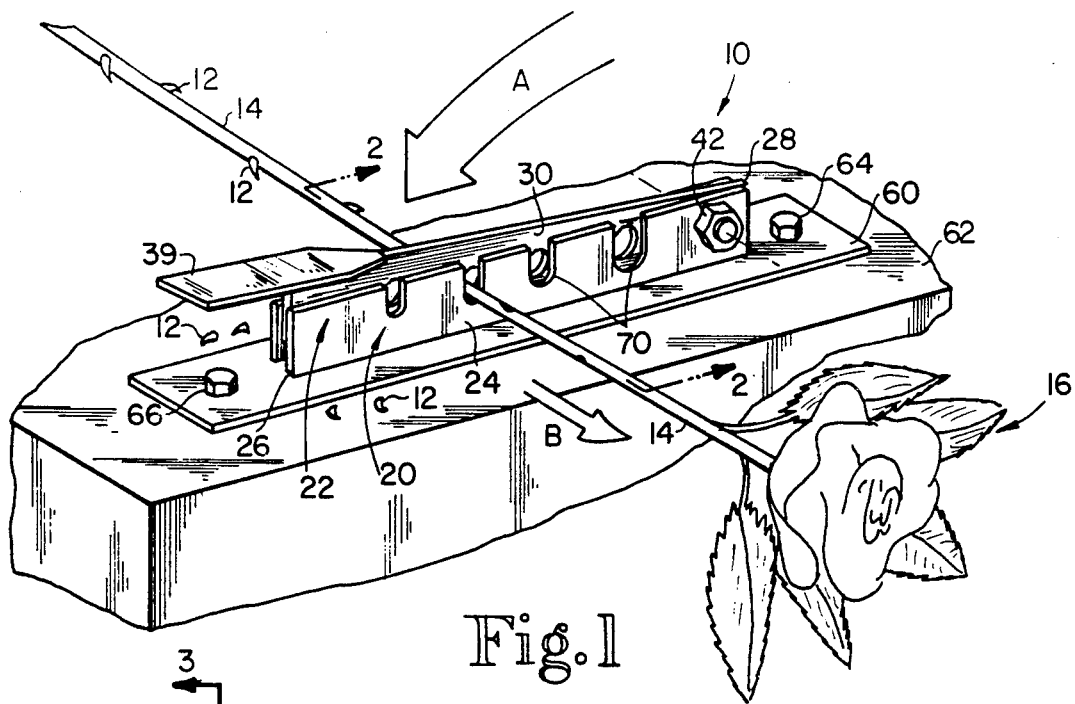
FIG. 1 is a perspective view of tool for dethorning plants indicating the positioning and direction of motion of the plant as it is drawn through apertures in the tool in a manner that removes thorns present on the plant.

As illustrated in FIG. 1, a dethorning tool 10 can be used to remove thorns 12 from the stem 14 of a rose 16. The tool 10 includes a first stripping arm 20 having a first stripping edge 22. The first stripping arm 20 has a longitudinally extending first body 24 that terminates in an opposed first end 26 and a second end 28.

The tool 10 also includes a second stripping arm 30 having a second stripping edge 32. The second stripping arm 30 has a longitudinally extending second body 34 that terminates in an opposed first end 36 and a second end 38. A handle 39 is attached to the first end 36 to extend outward from the arm 30 and facilitate manual grasping of the arm 30. The second end 38 is attached in pivoting relationship to the second end 28 of the stripping arm 20 by a pivot 40 extending therethrough. The pivot 40 shown in the Figures is a conventional nut and bolt arrangement with the arms 20 and 30 pivoting about a bolt 42 held in place by a pair of nuts 44 and 46, but other elements that provide pivoting attachment, such as pins, springs, or rods, can also be substituted as desired.

Figure 2:
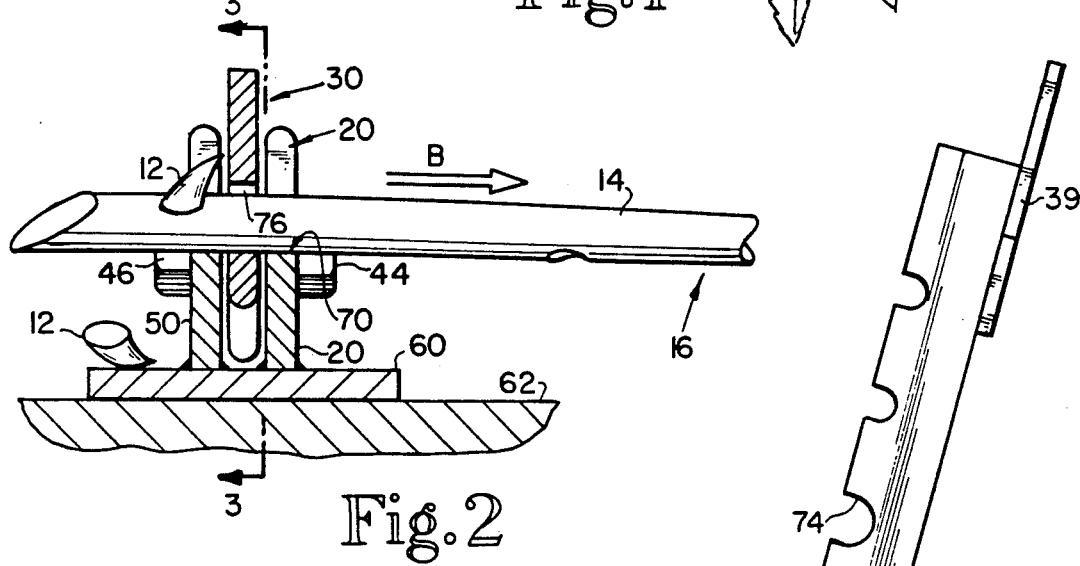
FIG. 2 is a cross sectional view of FIG. 1.

A third stripping arm 50, having a configuration substantially identical to that of the first stripping arm 20 is positioned in spaced apart parallel relationship to the first stripping arm 20. The spacing provided between the arms 20 and 50 is sufficient to allow insertion therebetween of the second stripping arm 30 as it is pivotally moved. As best shown in FIG. 2, the pivot 40 includes inserting the bolt 42 so that it completely extends through the arms 20, 30, and 50, and holding the bolt 42 in position with the nuts 44 and 46 threaded onto the bolt 42 on opposing sides of arms 20 and 50.

Both the first stripping arm 20 and the third stripping 50 are permanently attached to a plate 60 so that they are not movable with respect to each other. Welded, adhesive or bolted attachment is suitable for fixing the arms 20 and 50 in the desired spaced apart relationship. The plate 60 forms a mounting means permanently fastened to the top or sides of a table 62 with a pair of screws 64 and 66. The screws 64 and 66 extend through the plate 60 to threadedly engage the table 62 in a permanent mounting arrangement that prevents inadvertent rotation or movement of the tool 10.

The arms 20 and 50 are also configured so that a plurality of variously sized concavities 70 and 72 are respectively defined by the first stripping arm edge 22 and a third stripping arm edge 52. The concavities 70 and 72 are sized to allow plant stems of varying diameters to be inserted therein, while being too small to allow passage of thorns or other protuberances extending outward from stems as the plant stem 14 is drawn through. To trap the plant stem 14 in the concavities 70, 72 a second arm cutting edge 32 of the second arm 30 also provides a plurality of concavities 74 having sizes and positions along the arm 30 that substantially mirror the size and position along the arms 20 and 50 of the concavities 70 and 72. When closed, the concavities 70, 72, and 74 form a channel 76 through which the plant stem 14 can be drawn.

Figure 3:
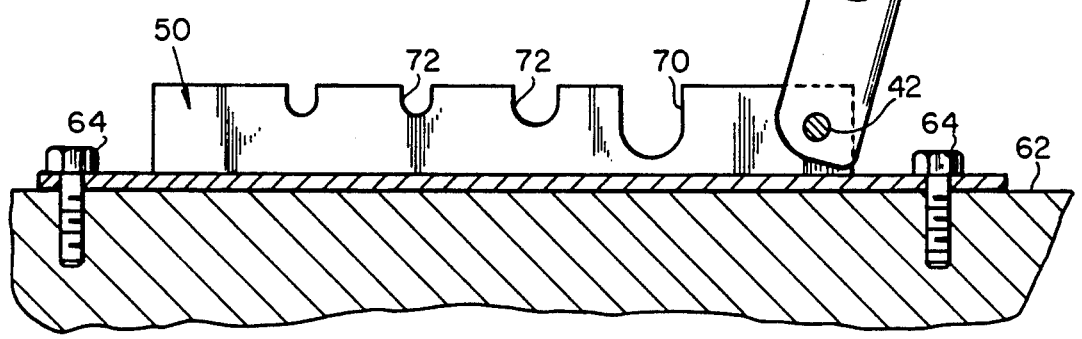
FIG. 3 is a side view of the tool shown in FIG. 1 in a open position ready to receive a plant with a first arm removed to better indicate the positioning of a third arm mounted to a plate and a pivotable second arm.

In operation, the tool 10 is initially brought into an open position as shown in FIG. 3, with the second arm 30 being pivoted about the pivot 40 so that it extends essentially perpendicular to the arms 20 and 50. A rose 16 can then be inserted into one pair of the plurality of concavities 70 and 72 so that the stem 14 fits within the concavities 70 and 72 but the thorns 12 cannot be drawn through the concavities 70 and 72 without contacting the arms 20 or 50. After the stem 14 is properly situated, the handle 39 is manually grasped to pivot the second arm 30 about the pivot 40 in the direction of arrow A to a position between the first and third arms 20 and 50 so that the stem 14 is trapped between the concavity 74 in the second arm 30 and the concavities 70 and 72 in the arms 20 and 50. This trapping action simultaneously forms a channel or cavity through which the stem 14 can extend and provides a three point support for the stem 14 (best shown in FIG. 2), which helps diminish damage to the stem 14 as it is drawn through the tool 10 in the direction indicated by the arrow B extending along the stem in FIG. 1. As the stem 14 is drawn through the concavities 70, 72 and 74, the thorns 12 are removed from the stem 14 because of the shearing force encountered as they contact the third stripping arm 50. After the thorns 12 have been removed, the handle 39 can be grasped to help pivot the arm 30 away from its position between the arms 20 and 50, allowing the dethorning process to be repeated with another rose or plant.

Although the invention has been described in detail with reference to certain preferred embodiments and specific examples, variations and modifications exist within the scope and spirit of the invention as described and as defined in the following claims.

The claimed invention is:

1. An apparatus for removing protuberances extending from a plant stem comprising:

a first stripping arm having a longitudinally extending first body terminating in an opposed first and second end, said first body having a first stripping arm edge extending between the first and second ends, a second stripping arm having a longitudinally extending second body terminating in an opposed first and a second end, said second body having a second stripping arm edge extending between the first and second ends, a pivot extending through and connecting the first end of the first body of the first stripping arm and the first end of the second body of the second stripping arm to allow pivotal movement of the second stripping arm relative to the first stripping arm, and mounting means for mounting the first stripping arm to a base to permit stripping of protuberances from any stem received between the stripping arms without requiring the apparatus to be manually held thereby inhibiting injury from the protuberances during their removal.

2. The apparatus of claim 1 wherein the mounting means includes a mounting plate in fixed attachment with the first stripping arm.

3. The apparatus of claim 1 further including a handle attached to the second end of the second stripping arm.

4. The apparatus of claim 1 further including a third stripping arm having a longitudinally extending third body respectively terminating in a first and a second end, said third body having a third stripping arm edge extending between the first and second ends, said third body being positioned to lie in spaced apart parallel relationship to the first body of the first stripping arm to define longitudinally extending cavity therebetween.

5. The apparatus of claim 1 wherein a portion of the first stripping arm edge of the first stripping arm is configured to define a channel into which a plant stem can be inserted.

6. The apparatus of claim 1 wherein a portion of the second stripping arm edge of the second stripping arm is configured to define a channel into which a plant stem can be inserted.

7. A tool for removing protuberances extending from a plant stem comprising a first stripping arm having a first stripping edge, a second stripping arm having a second stripping edge, positioning means for positioning at least a portion of the second stripping edge of the second stripping arm at a predetermined distance greater than a diameter of the stem from the first stripping edge of the first stripping arm and mounting means for mounting the first stripping arm to a base to permit stripping of protuberances from any stem received between the stripping arms without requiring the apparatus to be manually held thereby inhibiting injury from the protuberances during their removal.

8. Apparatus for removing protuberances extending from a plant stem comprising:

a first and a second longitudinally extending stripping arm, each stripping arm having a first end, a second end, and a stripping edge extending between the first and second ends, the stripping edge of each stripping arm including a plurality of notches for receiving a stem of a plant, pivot means joining the second ends of the first ad second stripping arms for allowing pivotal movement of the stripping arms with respect to each other to permit opening and closing of the plurality of notches, and mounting means fixed to the first stripping arm for mounting the apparatus to a fixed base to permit stripping of protuberances from any stem received in one of the notches without requiring the apparatus to be held thereby inhibiting injury from the protuberances during their removal.

9. The apparatus of claim 8 wherein the first stripping arm includes a base edge extending between said first and second ends opposite the stripping edge, and wherein the mounting means comprises a mounting plate fixed to the base edge of the first stripping arm.

10. The apparatus of claim 9 wherein the mounting means includes fastening means penetrating the mounting plate for fastening the mounting plate to the fixed base.

11. The apparatus of claim 8 further comprising a third stripping arm configured similarly to the first stripping arm, fixed to the mounting means parallel to but in spaced relation from the first stripping arm such that said second stripping arm pivots to a position between the first and third stripping arms.

12. The apparatus of claim 8 further comprising handle means fixed to the second end of said second stripping arm remote from said pivot means for facilitating pivotal movement of the second arm relative to the first stripping arm and mounting means.

* * * * *